US012333441B2

(12) United States Patent
Yoo et al.

(10) Patent No.: US 12,333,441 B2
(45) Date of Patent: Jun. 17, 2025

(54) REINFORCEMENT LEARNING METHOD AND APPARATUS USING TASK DECOMPOSITION

(71) Applicant: RESEARCH & BUSINESS FOUNDATION SUNGKYUNKWAN UNIVERSITY, Suwon-si (KR)

(72) Inventors: Min Jong Yoo, Suwon-si (KR); Gwang Pyo Yoo, Suwon-si (KR); Hong Uk Woo, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 426 days.

(21) Appl. No.: 18/075,669

(22) Filed: Dec. 6, 2022

(65) Prior Publication Data

US 2023/0177348 A1    Jun. 8, 2023

(30) Foreign Application Priority Data

Dec. 7, 2021   (KR) .................. 10-2021-0173678

(51) Int. Cl.
*G06K 9/62* (2022.01)
*G06N 3/092* (2023.01)
*G06V 10/774* (2022.01)

(52) U.S. Cl.
CPC ........... *G06N 3/092* (2023.01); *G06V 10/774* (2022.01)

(58) Field of Classification Search
CPC ...... G06N 3/092; G06N 3/0455; G06N 3/047; G06N 3/094; G06N 3/088; G06N 3/049; G06N 3/063; G06V 10/774; G06V 10/776; G06V 10/82
See application file for complete search history.

(56) References Cited

U.S. PATENT DOCUMENTS

| | | | |
|---|---|---|---|
| 11,049,243 B2 * | 6/2021 | Odry | G06F 18/2433 |
| 2021/0150310 A1 * | 5/2021 | Wu | G06T 11/60 |
| 2021/0224610 A1 | 7/2021 | Jha et al. | |
| 2022/0292134 A1 * | 9/2022 | Shahbazi Mirzahasanloo | G06F 21/32 |

FOREIGN PATENT DOCUMENTS

| | | | | |
|---|---|---|---|---|
| WO | WO-2022101515 A1 * | 5/2022 | | G06N 3/045 |
| WO | WO-2022135450 A1 * | 6/2022 | | G06F 18/251 |

OTHER PUBLICATIONS

Igl, Maximilian, et al. "Transient Non-Stationarity and Generalisation in Deep Reinforcement Learning." arXiv:2006.05826v4 [cs.LG] Sep. 22, 2021, (16 pages).

* cited by examiner

*Primary Examiner* — Xin Jia (57) ABSTRACT

According to an exemplary embodiment of the present invention, a reinforcement learning method using a task decomposition inference model in a time-variant environment includes selecting a plurality of paired transitions having a time-invariant common characteristic and a time-variant different environmental characteristic from a dataset including a plurality of transition data, based on a cycle generative adversarial network (GAN), training an auto encoder to embed each of the time-variant part and the time-invariant part with respect to the plurality of paired transitions into a latent space, and performing reinforcement learning on a transition corresponding to data collected in the time-variant environment, using the trained auto encoder.

12 Claims, 8 Drawing Sheets

Algorithm 1: Task decomposition embedding

Task Set $Set(\mathcal{T})$, paired transition buffer $\mathcal{D}$
    transitions buffer $\mathcal{D}_{\mathcal{T}_{(i)}}$, the number of sampled environment N
    for i from 0 to N do
        Get task $\mathcal{T}^{(i)}$ by random sampling in $Set(\mathcal{T})$
        Sample transitions $\tau = (s, a, r, s')$ from $\mathcal{T}^{(i)}$ by random policy
        $\mathcal{D}_{\mathcal{T}_{(i)}} = \mathcal{D}_{\mathcal{T}_{(i)}} \cup \{(s, a, r, s')\}$
    end for
    loop
        Choose i, j in 0, 1,..., N
        Initialize generators $G^{(1)}, G^{(2)}$, discriminators $D^{(1)}, D^{(2)}$
        loop
             $loss = \mathcal{L}_{gan}(G^{(1)}, D^{(2)}, \mathcal{D}_{\mathcal{T}_{(i)}}, \mathcal{D}_{\mathcal{T}_{(j)}})$
            $+\mathcal{L}_{gan}(G^{(2)}, D^{(1)}, \mathcal{D}_{\mathcal{T}_{(j)}}, \mathcal{D}_{\mathcal{T}_{(i)}}) + \mathcal{L}_{con}(G^{(1)}, G^{(2)})$
            optimize$((G^{(1)}, G^{(2)}, D^{(1)}, D^{(2)}), loss)$
        end loop
        for $\tau = (s, a, r, s')$ in $\mathcal{D}_{\mathcal{T}_{(i)}}$, $\tau'$ in $\mathcal{D}_{\mathcal{T}_{(j)}}$ do
            $\mathcal{D} = \mathcal{D} \cup \{(\tau, G^{(1)}(\tau))\} \cup \{(\tau', G^{(2)}(\tau'))\}$
        end for
    end loop
    Initialize encoder $enc$, decoder $dec$
    for $\tau$ in $\mathcal{D}$ do
        $loss = \mathcal{L}_{ae}(enc, dec) + \mathcal{L}_{sim}(enc) + \mathcal{L}_{recon}(enc, dec)$
        minimize$((enc, dec), loss)$
    end for

FIG. 7

Algorithm 2: Sliding windowed OGD algorithm replay buffer $D$, policy $\pi_\theta$, environment $env$, learning rate $\alpha$
$done \leftarrow False$
gradient buffer $\Lambda = \text{Queue}(\text{max\_len} = N), D = [\,]$
loop
    while not $done$ do
        $a_t \leftarrow \pi_\theta(s_t)$
        $s_{t+1}, r_t, done \leftarrow \text{step}(env, a_t)$
        $D \leftarrow D \cup \{\tau_t = (s_t, a_t, r_t, s_{t+1})\}$
        Fetch minibatch from $D$ and calculate $\nabla_\theta \mathcal{L}(\theta)$
        // Gram Schmidt Procedure
        for $i = 1, \ldots, N$ do
            $\lambda_t(\theta) \leftarrow \nabla_\theta \mathcal{L}(\theta) - \sum_{\lambda' \in \Lambda} proj(\nabla_\theta \mathcal{L}(\theta), \lambda')$
        end for
        $\theta \leftarrow \theta - \alpha \lambda_t(\theta)$
        $\text{enqueue}(\Lambda, \lambda_t(\theta))$
    end while
end loop

FIG. 8

REINFORCEMENT LEARNING METHOD AND APPARATUS USING TASK DECOMPOSITION

CROSS-REFERENCE TO RELATED APPLICATIONS

This application claims the priority of Korean Patent Application No. 2021-0173678 filed on Dec. 7, 2021, in the Korean Intellectual Property Office, the disclosure of which is incorporated herein by reference.

TECHNICAL FIELD

The present invention relates to a method and an apparatus for performing reinforcement learning using structural learning-based task decomposition in a non-stationary environment.

BACKGROUND ART OF INVENTION

Techniques, such as machine learning based autonomous driving, receive and process information from the sensor to perform the control. Specifically, among such machine learning techniques, deep learning-based reinforcement learning is mainly adopted. However, the environment in the real word dynamically changes over time and in many cases, such changes cannot be observed by the device's sensor. If the changes in the environment which cannot be observed affect the reinforcement learning process, the performance of the learning is significantly degraded.

Environmental elements which are not observed in the environment of the real-world change over time to frequently affect the learning. When the reinforcement learning is performed in this environment, it is deviated from the Markov decision process (MDP) which is a basic mathematical model of the reinforcement learning, which causes significant performance degradation. This problem may be expressed by a partially observable Marcov decision process (POMDP) and as a general solution of this problem, a recurrent neural network model is used.

However, due to the characteristic of the environment of the real world which quickly changes and is complex, even though the recurrent neural network model is used, stable learning is not possible. As a simulation experiment result using an autonomous drone simulator AirSim, it was confirmed that the reinforcement learning model using a long short-term memory (LSTM) which was a recurrent neural network model in an environment in which a wind speed changed was not smoothly trained.

Accordingly, a need for a reinforcement learning method using task decomposition which is capable of stably and effectively performing the reinforcement learning even in a real world in which unobservable environmental elements quickly change over time and an apparatus thereof is emerging.

DISCLOSURE OF INVENTION

Technical Problem to Be Solved

In order to achieve the above-mentioned object, the present invention provides a method and an apparatus for stably and effectively performing the reinforcement learning using structural learning based task decomposition in a non-stationary environment.

Technical Solution to Solve Problems

In order to achieve the above-described objects, according to an aspect of the present invention, a reinforcement learning method using task decomposition includes selecting a plurality of paired transitions having a time-invariant common characteristic and a time-variant different environmental characteristic from a dataset including a plurality of transition data, based on a cycle generative adversarial network (GAN); training an auto encoder to embed each of the time-variant part and the time-invariant part with respect to the plurality of paired transitions into a latent space; and performing reinforcement learning on a transition corresponding to data collected in the time-variant environment, using the trained auto encoder.

Desirably, in the performing of reinforcement learning, the reinforcement learning may be performed by applying orthogonal gradient descent to a reinforcement learning algorithm.

Desirably, the orthogonal gradient descent may use a sliding window corresponding to a time period with a predetermined size.

Desirably, a generator of the cycle GAN may be trained to modify the different environmental characteristic while maintaining the common characteristic.

Desirably, in the auto encoder, the encoder may embed each of the plurality of paired transitions ($\tau, \tau'$) into a time-invariant latent vector ($u, u'$) and a time-variant latent vector ($v, v'$), and a decoder reconstruct the plurality of paired transitions ($\tau, \tau'$) using the time-invariant latent vector ($u, u'$) and the time-variant latent vector ($v, v'$).

Desirably, the auto encoder may be trained based on a first loss function to allow the time-invariant latent vectors ($u, u'$) to have the same value, a second loss function to reconstruct each of the plurality of paired transitions ($\tau, \tau'$) only with the time-invariant latent vector ($u, u'$), and a third loss function to make the plurality of paired transitions ($\tau, \tau'$) equal to the results reconstructed using the encoder and the decoder.

Further, in order to achieve the above-described objects, according to another aspect of the present invention, a reinforcement learning apparatus using task decomposition includes a transition model unit which selects a plurality of paired transitions having a time-invariant common characteristic and a time-variant different environmental characteristic from the dataset including a plurality of transition data based on the cycle GAN; an embedding unit which trains an auto encoder to embed each of the time-variant part and the time-invariant part with respect to the plurality of paired transitions into a latent space; and a reinforcement learning unit which performs reinforcement learning on a transition corresponding to data collected in the time-variant environment, using the trained auto encoder.

Desirably, the reinforcement learning unit may perform the reinforcement learning by applying orthogonal gradient descent to a reinforcement learning algorithm.

Desirably, the orthogonal gradient descent may use a sliding window corresponding to a time period with a predetermined size.

Desirably, a generator of the cycle GAN may be trained to modify the different environmental characteristic while maintaining the common characteristic.

Desirably, in the auto encoder, the encoder may embed each of the plurality of paired transitions ($\tau, \tau'$) into a time-invariant latent vector ($u, u'$) and a time-variant latent vector ($v, v'$), and a decoder reconstruct each of the plurality of paired transitions ($\tau, \tau'$) using the time-invariant latent vector ($u, u'$) and the time-variant latent vector ($v, v'$).

Desirably, the auto encoder may be trained based on a first loss function to allow the time-invariant latent vectors (u, u') to have the same value, a second loss function to reconstruct each of the plurality of paired transitions (τ, τ') only with the time-invariant latent vector (u, u'), and a third loss function to make the plurality of paired transitions (τ, τ') equal to the results reconstructed using the encoder and the decoder.

Advantageous Effects of Invention

According to the present invention, an unobservable dynamic environment change problem which occurs when reinforcement learning trained in the simulation is introduced into the real world is solved. Therefore, it has an effect to solve a portability problem occurred when the reinforcement learning is introduced into the real world.

Further, as a result of drone flight simulation experiment using the present invention, when the reinforcement learning is performed in an environment which dynamically changes over time, as compared with a control group, the average learning performance increases by 67.4%.

DETAILED DESCRIPTION FOR IMPLEMENTING INVENTION

Those skilled in the art may make various modifications to the present invention and the present invention may have various embodiments thereof, and thus specific embodiments will be illustrated in the drawings and described in detail in detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Figure 1:
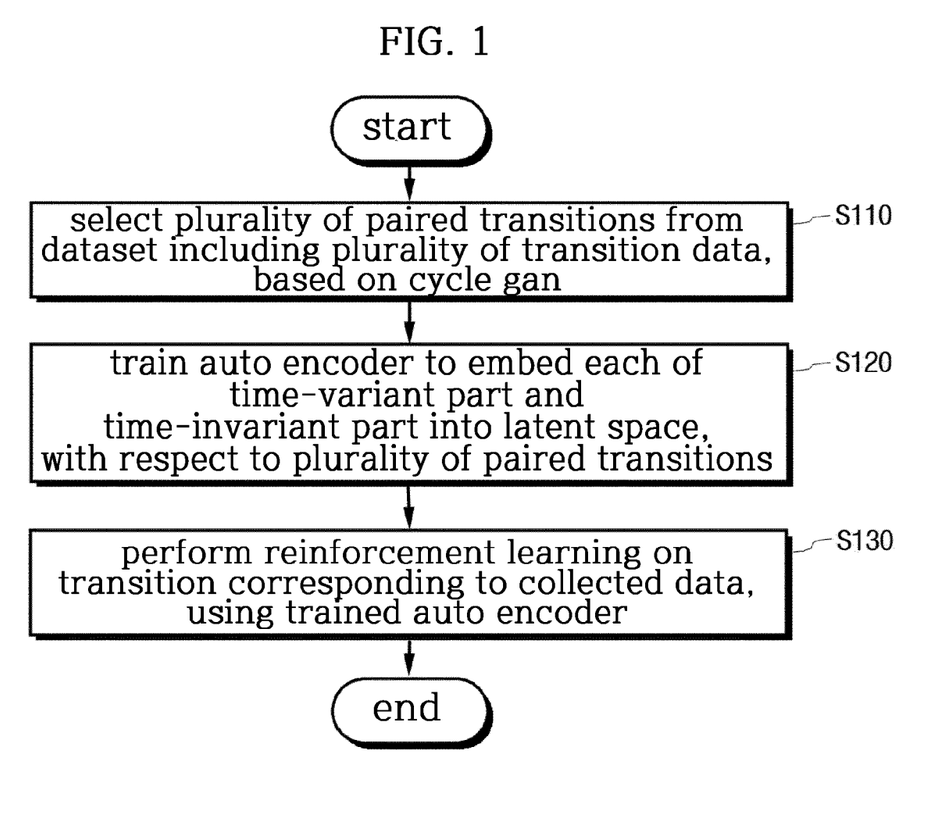
FIG. 1 is a flowchart illustrating a reinforcement learning method using task decomposition according to an exemplary embodiment of the present invention.

FIG. 1 is a flowchart illustrating a reinforcement learning method using task decomposition according to an exemplary embodiment of the present invention.

In step S110, a reinforcement learning apparatus selects a plurality of paired transitions having a time-invariant common characteristic and a time-variant different environmental characteristic from a dataset including a plurality of transition data, based on a cycle generative adversarial network (GAN).

Generally, the cycle GAN is known as an algorithm which converts two data each other. For example, images of horse and zebra are converted to each other, a picture and a photograph are converted to each other, and images of apple and orange may be converted to each other.

However, the reinforcement learning apparatus may use the cycle GAN to determine the paired transitions having a time-invariant common characteristic and a time-variant different environmental characteristic, among a plurality of transition data included in the dataset.

In other words, the reinforcement learning apparatus may select the paired transitions having different environmental characteristics to extract a common characteristic from a transition configured by a state, an action, a next state, and a reward.

In another exemplary embodiment, a generator of the cycle GAN may be trained to modify the different environmental characteristic while maintaining the common characteristic.

To this end, the reinforcement learning apparatus fixes a variant environmental characteristic and extracts an environment in a time-variant environment. The reinforcement learning apparatus extracts a transition in the environment using a random policy. Further, the reinforcement learning apparatus may train the cycle GAN using a set of the transitions collected as described above.

Figure 4:
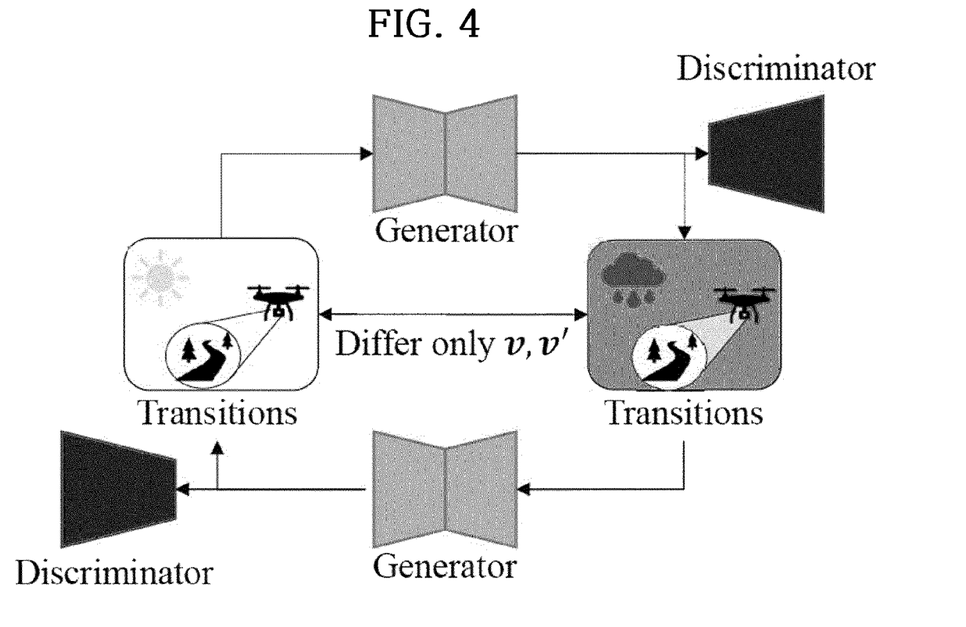
FIG. 4 is a view for explaining a structure of cycle GAN according to an exemplary embodiment of the present invention.

For example, referring to FIG. 4, the reinforcement learning apparatus fixes an environmental characteristic of sunny weather and an environmental characteristic of rainy weather, and extracts transitions corresponding to each of the two environments. The reinforcement learning apparatus randomly extracts one transition from each of the two transition sets to train the cycle GAN.

At this time, the generator of the cycle GAN may learn a function which modifies different parts while maintaining common parts between two environments in the transition, by means of Lcon and Lgan which are losses of the cycleGAN. The following Equations 1 and 2 represent Lcon and Lgan, respectively.

$$\mathcal{L}_{con}(G^{(1)}, G^{(2)}) = \mathbb{E}_{x \sim \mathcal{D}_{\tau_{(2)}}}[\|G^{(2)} \cdot G^{(1)}(x) - x\|_1] \quad \text{[Equation 1]}$$
$$+ \mathbb{E}_{y \sim \mathcal{D}_{\tau_{(1)}}}[\|G^{(1)} \cdot G^{(2)}(y) - y\|_1].$$

Here, Lcon is a cycle consistency loss, and $D_{T(1)}$ and $D_{T(2)}$ are sampled transitions, and $G^{(1)}$ and $G^{(2)}$ are a first generator and a second generator, respectively.

In the meantime, Lcon is to find a latent variable u corresponding to the time-invariant common characteristic from two transitions to specify a latent variable v corresponding to the time-variant different environmental characteristic.

$$\mathcal{L}_{gan}(G, D) = \mathbb{E}_{y \sim \mathcal{D}_{\tau_{(1)}}}[\log(D(y))] \quad \text{[Equation 2]}$$
$$+ \mathbb{E}_{x \sim \mathcal{D}_{\tau_{(2)}}}[\log(1 - D(G(x)))].$$

Here, Lgan is an adversarial loss, G and D are a generator and a discriminator of the GAN, respectively.

In the meantime, Lgan is to maximize the loss to allow the discriminator to find a distribution of the transition.

In step S120, the reinforcement learning apparatus trains the auto encoder to embed each of the time-variant part and the time-invariant part with respect to the plurality of paired transitions into a latent space.

That is, the reinforcement learning apparatus may train the auto encoder by embedding a time-variant part and a time-invariant part with respect to the plurality of paired transitions into a time-invariant latent space and a time-variant latent space.

In another exemplary embodiment, in the auto encoder, the encoder may embed each of the plurality of paired transitions (τ, τ') into a time-invariant latent vector (u, u') and a time-variant latent vector (v, v'), and a decoder reconstruct the plurality of paired transitions (τ, τ') using the time-invariant latent vector (u, u') and the time-variant latent vector (v, v').

For example, the reinforcement learning apparatus allows the encoder to embed the plurality of paired transitions into the time-invariant latent vector and the time-variant latent vector, and then the decoder to receive the embedded time-invariant latent vector and time-variant latent vector to regenerate the plurality of paired transitions.

Figure 5:
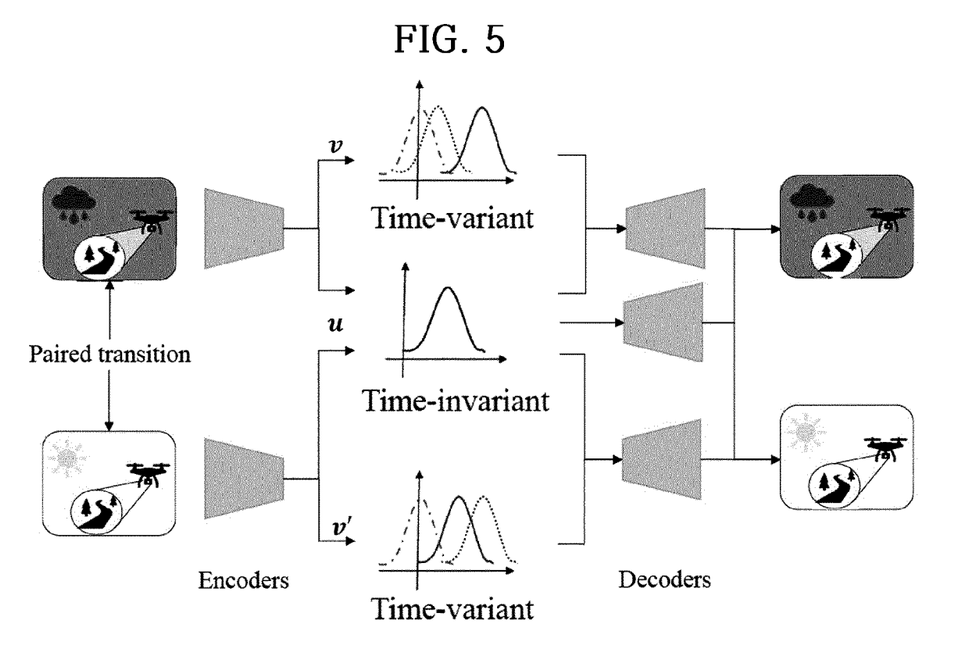
FIG. 5 is a view for illustrating a structure of an auto encoder according to an exemplary embodiment of the present invention.

At this time, referring to FIG. 5, the reinforcement learning apparatus may separately decode the time-invariant latent vector and the time-variant latent vector. To be more specific, the reinforcement learning apparatus decodes each of the common time-invariant latent vectors and the different time-variant latent vectors in the plurality of paired transitions, and then collects the vectors to reconstruct the plurality of paired transitions.

In other words, the reinforcement learning apparatus separately decodes a part corresponding to the time-invariant common characteristic in the plurality of input paired transitions and may separately decode the time-variant different environmental characteristics.

Further, in another exemplary embodiment, the auto encoder may be trained based on a first loss function to allow the time-invariant latent vectors (u, u') to have the same value, a second loss function to reconstruct each of the plurality of paired transitions (τ, τ') only with the time-invariant latent vector (u, u'), and a third loss function to make the plurality of paired transitions (τ, τ') equal to the results reconstructed using the encoder and the decoder.

At this time, the first loss function may be represented by the following Equation 3.

$$\mathcal{L}_{sim}(\text{enc}) = \|u - u'\|_2 = \|\text{enc}(\tau)|_u - \text{enc} \circ G(\tau)|_u\|_2 \quad \text{[Equation 3]}$$

Here, Lsim is a similarity loss, and u and u' are corresponding time-invariant latent vectors of the paired transitions.

At this time, the auto encoder may be trained to express the time-invariant common characteristic by allowing the time-invariant latent vectors (u, u') to have the same value using the first loss function.

Further, the second loss function may be represented by the following Equation 4.

$$\mathcal{L}_{recon}(\text{enc}, \text{dec}) = \|\tau - \text{dec}(u, 0)\|_2 \quad \text{[Equation 4]}$$

Here, Lrecon is a reconstruction loss and u is a time-invariant latent vector.

At this time, the auto encoder may be trained using the second loss function to reconstruct each of the plurality of paired transitions (τ, τ') only with the time-invariant latent vector (u, u') by including as many common characteristics as possible in the time-invariant latent vector (u, u').

Further, the second loss function may be represented by the following Equation 5.

$$\mathcal{L}_{ae}(\text{enc}, \text{dec}) = \|\tau - \text{dec} \circ \text{enc}(\tau)\|_2, \quad \text{[Equation 5]}$$

Here, Lae is a loss of the auto encoder.

At this time, the auto encode may be trained using the third loss function to minimize the loss of the auto encoder to obtain the time-variant latent vector with a part which is not expressed only with the time-invariant latent vector.

At this time, the auto encoder is trained to minimize all the first loss function, the second loss function, and the third loss to be used to achieve the object of the present invention.

Finally, in step S130, the reinforcement learning apparatus performs the reinforcement learning on the transition corresponding to the data collected in the time-variant environment using the trained auto encoder.

That is, the reinforcement learning apparatus may perform the reinforcement learning by configuring transition corresponding to continuous data collected in the time-variant environment. At this time, the reinforcement learning apparatus may efficiently perform the stable reinforcement learning by using the time-variant different environmental characteristic of the transition as an observed sensing value using the previously trained auto encoder.

In the meantime, the transition corresponding to the data collected in the time-variant environment may be data reconstructing the dataset used in step S110 in time series, or data collected in the real environment in time series.

Figure 3:
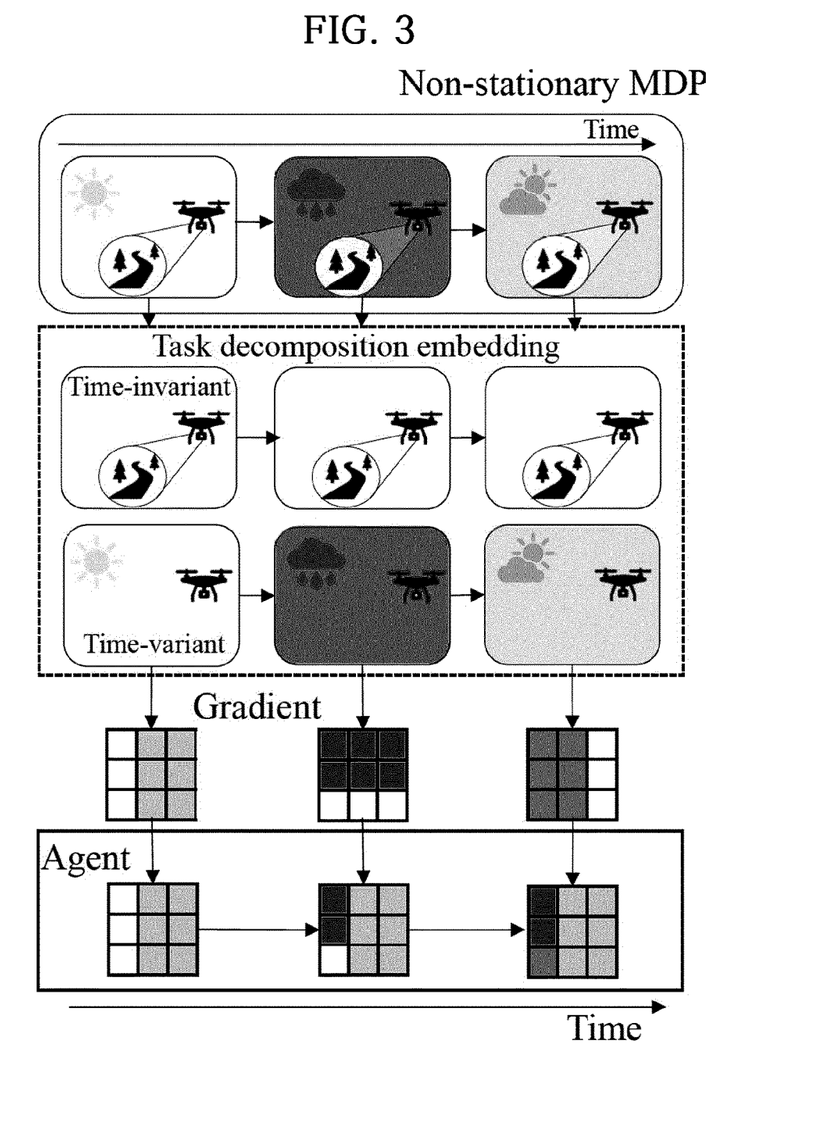
FIG. 3 is a view for explaining an entire structure of a reinforcement learning method using task decomposition according to an exemplary embodiment of the present invention.

For example, referring to FIG. 3, the entire structure of the present invention is illustrated. Here, the reinforcement learning apparatus may adjust a gradient to reduce the interference while performing the repeated learning on various tasks. To be more specific, it may be understood that in FIG. 3, the gradient is represented with a colored cell and the gradient is adjusted to avoid the overlapping of the cells.

In another exemplary embodiment, the reinforcement learning apparatus may perform the reinforcement learning by applying the orthogonal gradient descent to the reinforcement learning algorithm.

When the reinforcement learning apparatus learns in the environment in which the environmental characteristic changes, it may be important that a previously learned knowledge is not erased by the subsequent learning process. To this end, the reinforcement learning apparatus may introduce the orthogonal gradient descent to the reinforcement learning algorithm.

To be more specific, the reinforcement learning apparatus may orthogonalize the gradient generated during the subsequent learning using a previously generated gradient in the reinforcement learning process. Further, the reinforcement learning apparatus does not allow the gradient generated thereby to interfere with the previously learned gradient to maximize the learning effect.

In another exemplary embodiment, the orthogonal gradient descent may use a sliding window corresponding to a time period with a predetermined size.

Generally, the orthogonal gradient descent is used when an exact time point at which the task changes is known. However, in real data in which the environment changes over time, it is difficult to know an exact task changing time point so that a sliding window corresponding to the time period with a predetermined size is applied to the orthogonal gradient descent to repeatedly update the gradient.

At this time, the orthogonal gradient descent may be represented by the following Equation 6.

$$\nabla_\theta \mathcal{L}_t(\theta) \perp \lambda_{t-i}(\theta) \text{ for } i=1,2,3,\ldots,N \quad \text{[Equation 6]}$$

Here, $\nabla_\theta L_t(\theta)$ is a directionality of the gradient generated by the learning at a timestep t, and $\lambda_{t-i}(\theta)$ is a gradient applied at the timestep t−1.

At this time, it is understood that the sliding window corresponds to the time period N, and the directionality of the gradient may be determined to be orthogonal to the previous loss using the following Equation 7 corresponding to the Gram-Schmidt method.

$$\lambda(\theta) \leftarrow \nabla_\theta \mathcal{L}(\theta) - \sum_{\lambda' \in \Lambda} proj(\nabla_\theta \mathcal{L}(\theta), \lambda') \quad \text{[Equation 7]}$$

Here, $proj(\nabla_\theta L_t(\theta), \lambda')$ is a projection of $\nabla_\theta L_t(\theta)$ to $\lambda'$ and $\Lambda$ is a gradient buffer for the previous gradient.

As a result, the previous gradients may be set to be orthogonal to each other. Further, the model parameter θ may be updated as represented in Equation 8 at a learning rate α.

$$\theta \leftarrow \theta - \alpha\lambda(\theta). \quad \text{[Equation 8]}$$

Figure 6:
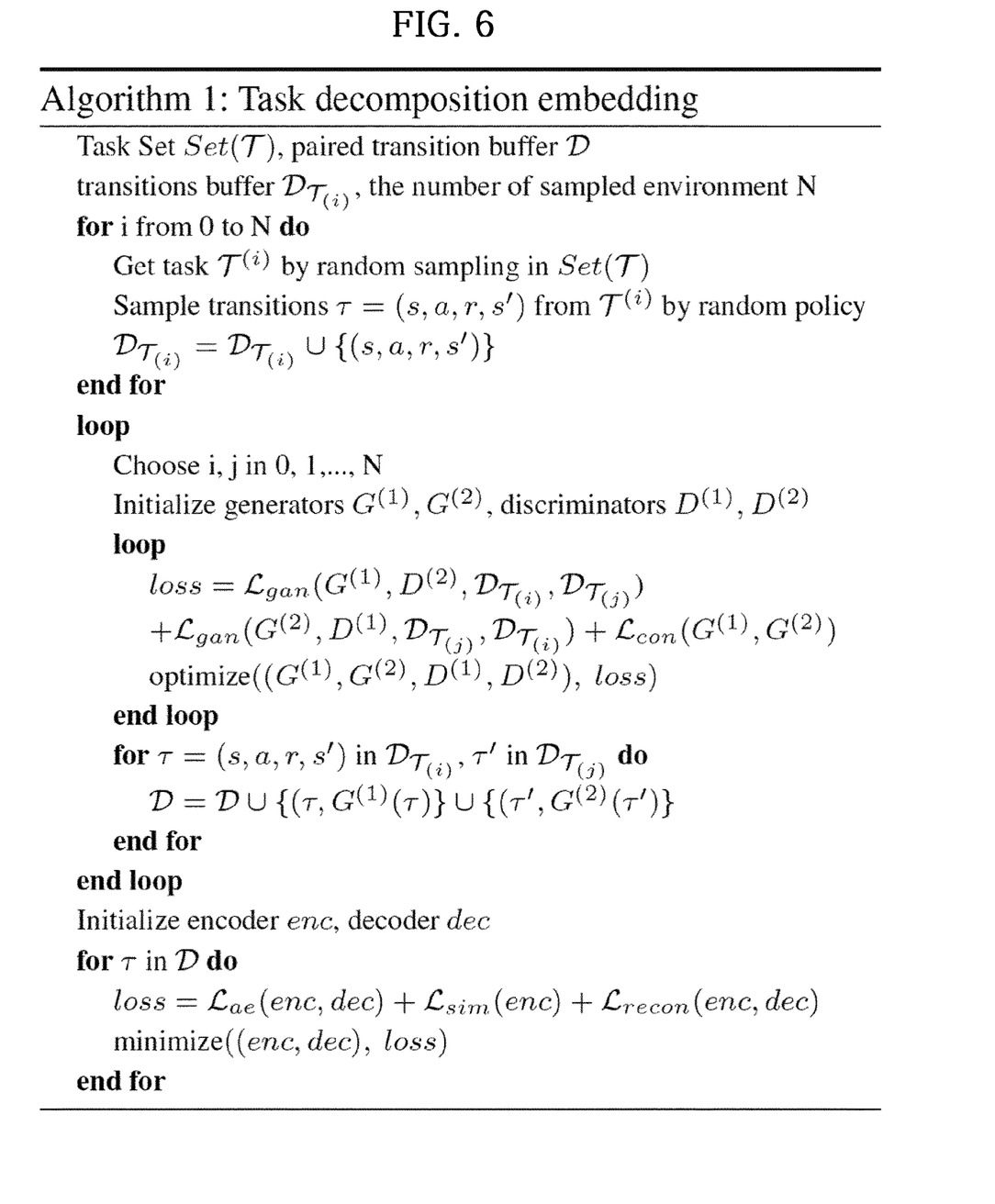
FIG. 6 is a view illustrating an algorithm for explaining a task decomposing method according to an exemplary embodiment of the present invention.

In the meantime, referring to FIG. 6, an algorithm for explaining a task decomposing method according to an exemplary embodiment of the present invention is illustrated.

At this time, the task decomposing method corresponds to steps S110 and S120 which have been described above, and to be more specific, includes training of the cycle GAN, configuring of the plurality of paired transitions, and training of the auto encoder.

Figure 7:
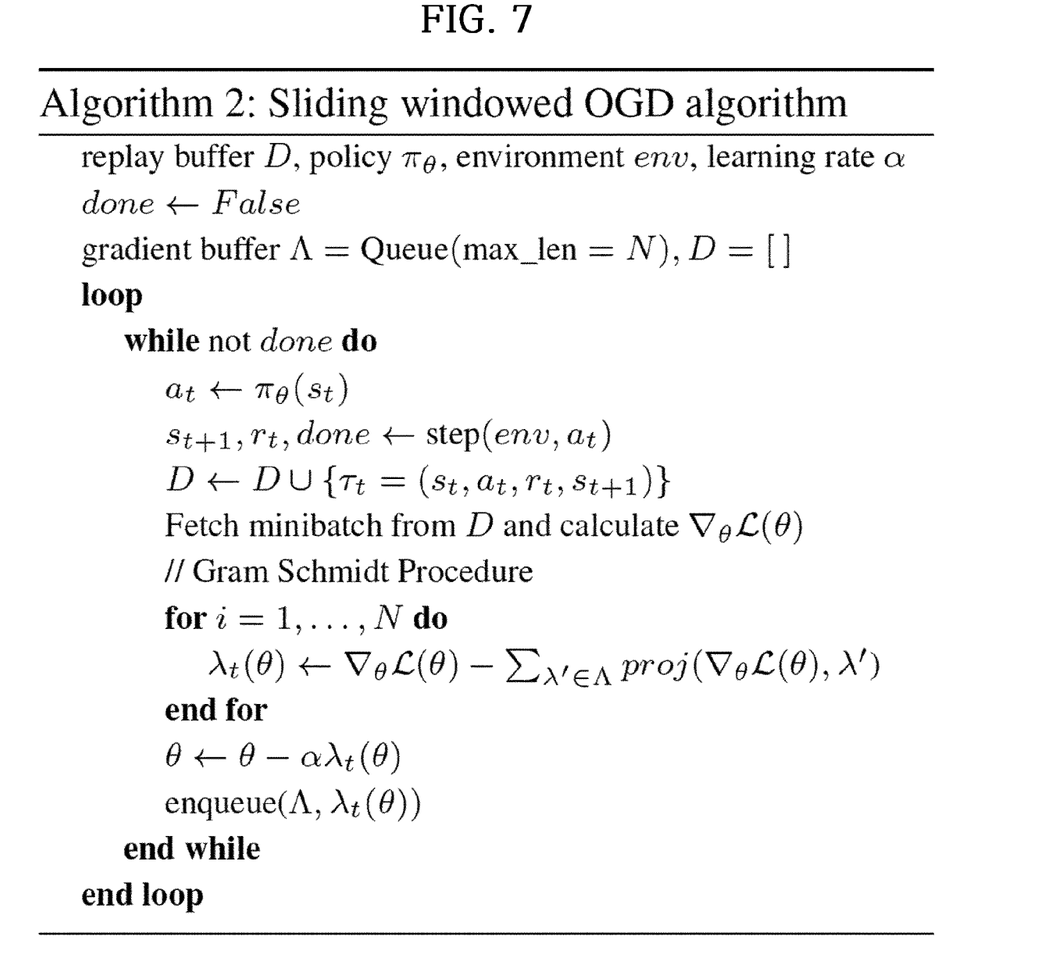
FIG. 7 is a view illustrating an algorithm of an orthogonal gradient descent using a sliding window according to an exemplary embodiment of the present invention.

Further, referring to FIG. 7, an algorithm of an orthogonal gradient descent using a sliding window according to an exemplary embodiment of the present invention is illustrated.

At this time, the algorithm of the orthogonal gradient descent corresponds to the step S130 which has been described above, and to be more specifically, includes a process of causing the gradients to be orthogonal using the Gram Schmidt method and the sliding window.

Figure 8:
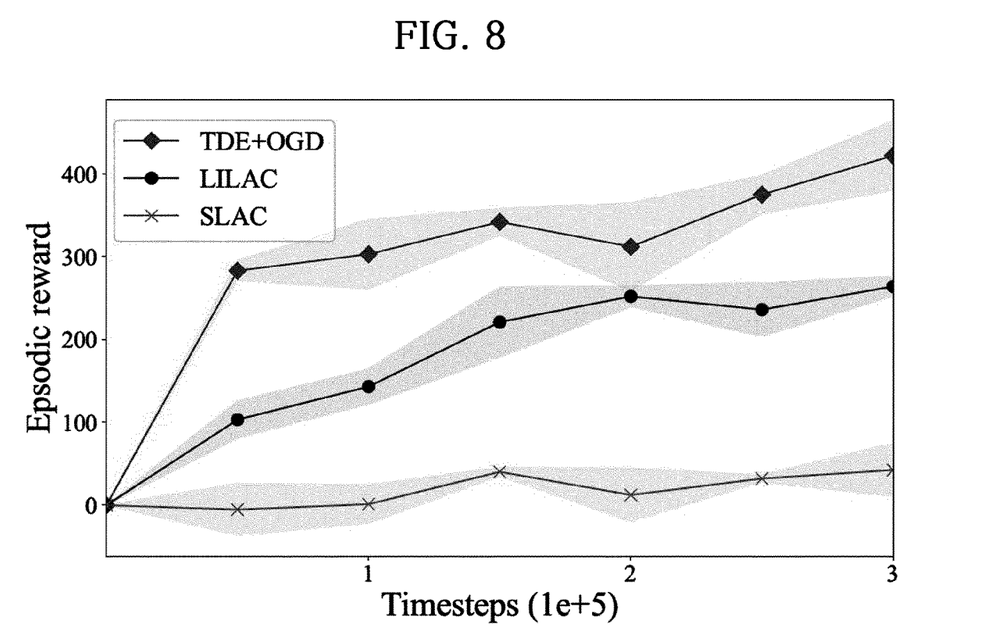
FIG. 8 is a view for explaining a comparison experiment result according to an exemplary embodiment of the present invention.

Further, referring to FIG. 8, a comparison experiment result according to the exemplary embodiment of the present invention is illustrated.

That is, it is a result of conducting the simulation experiment using an unreal engine based autonomous drone simulator AirSim for performance evaluation of the present invention. Further, as for the comparison experiment, SLAC and LILAC which were methodologies in the non-stationary environment were used.

At this time, when the autonomous learning performances of the present invention TDE+OGD, SLAC, and LILAC are compared, it may be understood that the method proposed by the present invention is very superior in performance to SLAC, and has an average performance increase of 67.4% compared to the LILAC.

Figure 2:
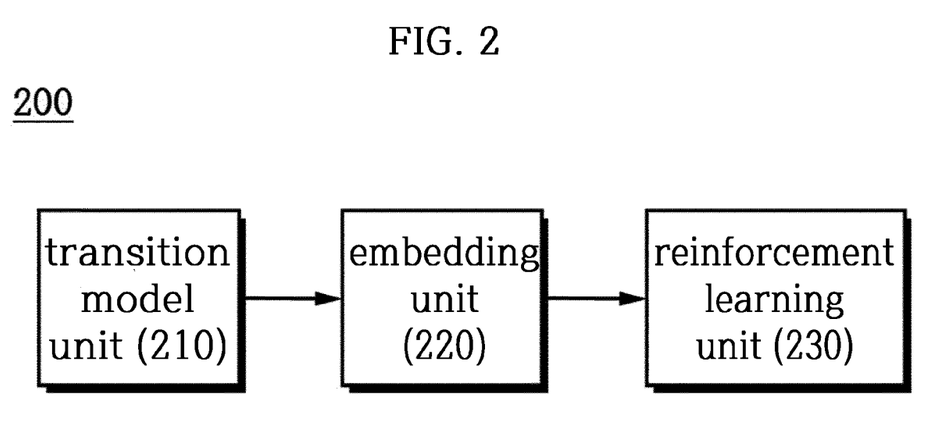
FIG. 2 is a block diagram illustrating a reinforcement learning apparatus using task decomposition according to an exemplary embodiment of the present invention.

FIG. 2 is a block diagram illustrating a reinforcement learning apparatus using task decomposition according to an exemplary embodiment of the present invention.

Referring to FIG. 2, the reinforcement learning apparatus 200 using task decomposition according to the exemplary embodiment of the present invention includes a transition model unit 210, an embedding unit 220, and a reinforcement learning unit 230.

The reinforcement learning apparatus 200 using task decomposition according to the exemplary embodiment of the present invention may be mounted in various types of computing devices, such as smart phones, table PCs, desktop PCs, notebook PCs, and server computers.

The transition model unit 210 selects a plurality of paired transitions having a time-invariant common characteristic and a time-variant different environmental characteristic from the dataset including a plurality of transition data based on the cycle GAN.

In another exemplary embodiment, a generator of the cycle GAN may be trained to modify the different environmental characteristic while maintaining the common characteristic.

The embedding unit 220 trains the auto encoder to embed a time-variant part and a time-invariant part with respect to the plurality of paired transitions into the latent space.

In another exemplary embodiment, in the auto encoder, the encoder may embed each of the plurality of paired transitions (τ, τ') into a time-invariant latent vector (u, u') and a time-variant latent vector (v, v'), and a decoder reconstruct the plurality of paired transitions (τ, τ') using the time-invariant latent vector (u, u') and the time-variant latent vector (v, v').

Further, in another exemplary embodiment, the auto encoder may be trained based on a first loss function to allow the time-invariant latent vectors (u, u') to have the same value, a second loss function to reconstruct each of the plurality of paired transitions (τ, τ') only with the time-invariant latent vector (u, u'), and a third loss function to make the plurality of paired transitions (τ, τ') equal to the results reconstructed using the encoder and the decoder.

The reinforcement learning unit 230 performs the reinforcement learning on the transition corresponding to data collected from the time-variant environment using the trained auto encoder.

In another exemplary embodiment, the reinforcement learning unit 230 may perform the reinforcement learning by applying the orthogonal gradient descent to the reinforcement learning algorithm.

In another exemplary embodiment, the orthogonal gradient descent may use a sliding window corresponding to a time period with a predetermined size.

It will be appreciated that various exemplary embodiments of the present invention have been described herein for purposes of illustration, and that various modifications, changes, and substitutions may be made by those skilled in the art without departing from the scope and spirit of the present invention. Accordingly, the exemplary embodiments carried out in the present invention are intended to not limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

DRAWINGS

[FIG. 1]

시작: START
S110: SELECT PLURALITY OF PAIRED TRANSITIONS FROM DATASET INCLUDING PLURALITY OF TRANSITION DATA, BASED ON Cycle GAN
S120: TRAIN AUTO ENCODER TO EMBED EACH OF TIME-VARIANT PART AND TIME-INVARIANT PART INTO LATENT SPACE, WITH RESPECT TO PLURALITY OF PAIRED TRANSITIONS
S130: PERFORM REINFORCEMENT LEARNING ON TRANSITION CORRESPONDING TO COLLECTED DATA, USING TRAINED AUTO ENCODER
종료: END

[FIG. 2]

210: TRANSITION MODEL UNIT
220: EMBEDDING UNIT
230: REINFORCEMENT LEARNING UNIT

The invention claimed is:

1. A reinforcement learning method using a task decomposition inference model in a time-variant environment, comprising:
selecting a plurality of paired transitions having a time-invariant common characteristic and a time-variant different environmental characteristic from a dataset including a plurality of transition data, based on a cycle generative adversarial network (GAN);
training an auto encoder to embed each of the time-variant part and the time-invariant part with respect to the plurality of paired transitions into a latent space; and
performing reinforcement learning on a transition corresponding to data collected in the time-variant environment, using the trained auto encoder.

2. The reinforcement learning method using task decomposition according to claim 1, wherein in the performing of reinforcement learning, the reinforcement learning is performed by applying orthogonal gradient descent to a reinforcement learning algorithm.

3. The reinforcement learning method using task decomposition according to claim 2, wherein the orthogonal gradient descent uses a sliding window corresponding to a time period with a predetermined size.

4. The reinforcement learning method using task decomposition according to claim 1, wherein a generator of the cycle GAN is trained to modify the different environmental characteristic while maintaining the common characteristic.

5. The reinforcement learning method using task decomposition according to claim 1, wherein in the auto encoder, the encoder embeds each of the plurality of paired transitions ($\tau$, $\tau'$) into a time-invariant latent vector ($u$, $u'$) and a time-variant latent vector ($v$, $v'$), and a decoder reconstructs each of the plurality of paired transitions ($\tau$, $\tau'$) using the time-invariant latent vector ($u$, $u'$) and the time-variant latent vector ($v$, $v'$).

6. The reinforcement learning method using task decomposition according to claim 5, wherein the auto encoder is trained based on a first loss function to allow the time-invariant latent vectors ($u$, $u'$) to have the same value, a second loss function to reconstruct each of the plurality of paired transitions ($\tau$, $\tau'$) only with the time-invariant latent vector ($u$, $u'$), and a third loss function to make the plurality of paired transitions ($\tau$, $\tau'$) equal to the results reconstructed using the encoder and the decoder.

7. A reinforcement learning apparatus using a task decomposition inference model in a time-variant environment, comprising:
a transition model unit which selects a plurality of paired transitions having a time-invariant common characteristic and a time-variant different environmental characteristic from the dataset including a plurality of transition data based on the cycle GAN;
an embedding unit which trains an auto encoder to embed each of the time-variant part and the time-invariant part with respect to the plurality of paired transitions into a latent space; and
a reinforcement learning unit which performs reinforcement learning on a transition corresponding to data collected in the time-variant environment, using the trained auto encoder.

8. The reinforcement learning apparatus using task decomposition according to claim 7, wherein the reinforcement learning unit performs the reinforcement learning by applying orthogonal gradient descent to a reinforcement learning algorithm.

9. The reinforcement learning apparatus using task decomposition according to claim 8, wherein the orthogonal gradient descent uses a sliding window corresponding to a time period with a predetermined size.

10. The reinforcement learning apparatus using task decomposition according to claim 7, wherein a generator of the cycle GAN is trained to modify the different environmental characteristic while maintaining the common characteristic.

11. The reinforcement learning apparatus using task decomposition according to claim 7, wherein in the auto encoder, the encoder embeds each of the plurality of paired transitions ($\tau$, $\tau'$) into a time-invariant latent vector ($u$, $u'$) and a time-variant latent vector ($v$, $v'$), and a decoder reconstructs each of the plurality of paired transitions ($\tau$, $\tau'$) using the time-invariant latent vector ($u$, $u'$) and the time-variant latent vector ($v$, $v'$).

12. The reinforcement learning apparatus using task decomposition according to claim 11, wherein the auto encoder is trained based on a first loss function to allow the time-invariant latent vectors ($u$, $u'$) to have the same value, a second loss function to reconstruct each of the plurality of paired transitions ($\tau$, $\tau'$) only with the time-invariant latent vector $(u, u')$, and a third loss function to make the plurality of paired transitions $(\tau, \tau')$ equal to the results reconstructed using the encoder and the decoder.

* * * * *